United States Patent
Adams et al.

(10) Patent No.: US 10,221,730 B2
(45) Date of Patent: Mar. 5, 2019

(54) ELECTRICAL MACHINES

(71) Applicant: ROLLS-ROYCE plc, London (GB)

(72) Inventors: Edward Adams, Derby (GB); Ellis Ful Hen Chong, Derby (GB); Fermin Moliner-Cantos, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/954,320

(22) Filed: Nov. 30, 2015

(65) Prior Publication Data
US 2016/0177770 A1   Jun. 23, 2016

(30) Foreign Application Priority Data

Dec. 18, 2014 (GB) .................................. 1422586.6

(51) Int. Cl.
| | |
|---|---|
| F01D 15/10 | (2006.01) |
| F02C 7/26 | (2006.01) |
| H02K 7/116 | (2006.01) |
| H02K 1/14 | (2006.01) |
| H02K 1/17 | (2006.01) |
| F01L 15/10 | (2006.01) |
| H02K 7/18 | (2006.01) |
| H02K 16/04 | (2006.01) |
| H02K 19/10 | (2006.01) |

(52) U.S. Cl.
CPC .............. F01L 15/10 (2013.01); F02C 7/26 (2013.01); H02K 1/14 (2013.01); H02K 1/17 (2013.01); H02K 7/116 (2013.01); H02K 7/1823 (2013.01); H02K 16/04 (2013.01); H02K 19/103 (2013.01)

(58) Field of Classification Search
CPC ......... H02K 16/04; H02K 19/06; H02K 51/00

USPC .................................. 290/46, 52, 40 R, 4 R
See application file for complete search history.

(56) References Cited

U.S. PATENT DOCUMENTS

| 6,094,011 A | 7/2000 | Notsu | |
|---|---|---|---|
| 2002/0122723 A1* | 9/2002 | Care | F01D 5/14 416/3 |
| 2004/0123603 A1* | 7/2004 | Care | F01D 5/14 60/801 |
| 2005/0218738 A1* | 10/2005 | Hsu | H02K 16/00 310/114 |
| 2010/0123426 A1* | 5/2010 | Nashiki | H02K 1/12 318/701 |
| 2010/0141061 A1* | 6/2010 | Ramu | H02K 1/14 310/46 |

(Continued)

FOREIGN PATENT DOCUMENTS

| EP | 1 930 554 A2 | 6/2008 |
|---|---|---|
| EP | 2 280 150 A1 | 2/2011 |

(Continued)

OTHER PUBLICATIONS

Jun. 15, 2016 Search Report issued in European Patent Application No. 15 19 6723.

(Continued)

Primary Examiner — Tulsidas C Patel
Assistant Examiner — Joseph Ortega
(74) Attorney, Agent, or Firm — Oliff PLC

(57) ABSTRACT

An arrangement of electrical machines including: a variable reluctance rotor. The arrangement also including an annular array of stators; each stator configured to function, in conjunction with the rotor, as an electrical machine.

18 Claims, 8 Drawing Sheets

(56) References Cited

U.S. PATENT DOCUMENTS

| | | | | |
|---|---|---|---|---|
| 2010/0156205 A1* | 6/2010 | Davis | H02K 11/048 | 310/46 |
| 2011/0234180 A1* | 9/2011 | Cullen | H02P 29/0241 | 322/89 |
| 2012/0094555 A1* | 4/2012 | Calverley | B63H 23/24 | 440/6 |
| 2012/0286516 A1* | 11/2012 | Chong | H02K 7/1823 | 290/52 |
| 2012/0326539 A1* | 12/2012 | Webster | H02K 16/00 | 310/46 |
| 2013/0026864 A1* | 1/2013 | Bae | H02K 19/103 | 310/46 |
| 2014/0062267 A1* | 3/2014 | Pollock | H02P 25/08 | 310/68 D |
| 2014/0230403 A1* | 8/2014 | Merry | F02K 3/04 | 60/226.1 |
| 2014/0291987 A1* | 10/2014 | Dooley | F02C 7/275 | 290/34 |

FOREIGN PATENT DOCUMENTS

| | | |
|---|---|---|
| EP | 2 312 744 A1 | 4/2011 |
| GB | 2 372 157 A | 8/2002 |
| GB | 2 508 022 A | 5/2014 |
| GB | 2508022 * | 5/2014 |
| WO | 02/15367 A1 | 2/2002 |
| WO | 2014/117350 A1 | 8/2014 |

OTHER PUBLICATIONS

Jul. 1, 2015 Search Report issued in British Patent Application No. GB1422586.6.

\* cited by examiner

ELECTRICAL MACHINES

The present invention relates to an arrangement of electrical machines. In particular, but not exclusively, it relates to an arrangement of electrical machines to be mounted in a gas turbine engine or other rotating assembly.

In a gas turbine engine it is beneficial to generate electrical power for various uses. For example the generated electrical power is used to drive oil pumps and fuel pumps; to power the engine controller; and to supply to the aircraft or vessel which the gas turbine engine powers.

Typically an electric generator is supplied in addition to the gas turbine engine and coupled to it. The electric generator may be mechanically driven to start it, from the gas turbine engine or a separate starter. The electrical machine may be located adjacent to an auxiliary gearbox on the outside of a gas turbine engine.

Disadvantageously it is often difficult to access such electrical machines, for maintenance or replacement. Furthermore, as the requirement for electrical power in gas turbine engines and the aircraft (and other vehicles and vessels) that they power increases, the physical size taken by the electrical machines becomes challenging to fit in the available space envelope.

The present invention provides an arrangement of electrical machines that seeks to address the aforementioned problems.

Accordingly the present invention provides an arrangement of electrical machines comprising:
 a variable reluctance rotor; and
 an annular array of stators; each stator configured to function, in conjunction with the rotor, as an electrical machine.

Advantageously, the arrangement provides a plurality of independent electrical machines which share a common rotor. Advantageously the rotor has high reliability and low losses because it does not include windings or magnets. Advantageously the stators may be unevenly spaced around the rotor to accommodate existing pipes, cables or other components. Advantageously the stators are individually replaceable. Advantageously the output of the stators may be coupled together, selectively or routinely, to provide a greater amount of electrical power to a load and/or for redundancy.

Each stator may be self-exciting.

The rotor may comprise a magnetically permeable material. The magnetically permeable material may comprise a ferromagnetic material. Advantageously the rotor is simple and robust.

There may be a circumferential gap between adjacent stators. Advantageously the circumferential gap or gaps accommodate existing pipes, cables or other components. Each stator may have a circumferential extent of up to 180°. Each stator may have a circumferential extent greater than 180° but less than 360°. Adjacent stators may have different circumferential extent from each other. The stators may be irregularly spaced. Advantageously the stators can each output different amounts of electrical power and supply it to different loads. Advantageously the stators can be mounted in circumferential gaps between existing components around a rotor.

Each stator may comprise one or more windings. Each stator may comprise one or more magnets. The magnets may be permanent magnets or electromagnets. Advantageously the windings and magnets are easily accessible to repair and/or replace.

The array of stators may be radially outside the rotor. The rotor may be radially outside the array of stators.

The rotor may be formed of two or more pieces, the pieces being joined during use of the arrangement and being detached for assembly and/or disassembly of the arrangement. Advantageously the rotor can be more easily assembled and disassembled for maintenance activities and to access other components.

At least one of the stators may be configured as a multi-phase generator. At least one of the stators may be configured as a 3-phase generator. The arrangement may comprise at least three stators, each stator configured as a phase of a distributed multi-phase generator. The arrangement may comprise at least three stators, each stator configured as a phase of a distributed 3-phase generator. Advantageously each stator may be sized for the load for which it generates.

At least one of the stators may be configured as a motor. Advantageously each stator may be sized for the power it will receive.

At least one of the stators may be configured to output the speed and/or acceleration of the rotor. Alternatively a speed probe may be provided in a circumferential gap between two stators to output the speed and/or acceleration of the rotor. Advantageously separate speed and/or acceleration monitoring may be omitted.

The output of at least two of the stators may be coupled. Advantageously the total output may be large but each stator be relatively small. Advantageously this arrangement may fit in available space. One of the stators may comprise a rectifier. The rectifier may be used to couple the output of two or more of the stators. More than one of the stators may comprise a rectifier. Each rectifier may be used to couple the output of two or more of the stators.

The rotor may be coupled to a shaft of a gearbox. The gearbox may be an epicyclic gearbox. The shaft may be an input shaft. The shaft may be an output shaft. The rotor may be formed by a rotating component of the gearbox. The rotor may be coupled to a rotating component of the gearbox. Advantageously a shaft of a gearbox may rotate quickly and therefore the arrangement of electrical machines may extract large amounts of electrical power.

The output of each electrical machine may be coupled to a load, the loads comprising any one or more of: a breather arrangement in a gas turbine engine; one or more tunnel or steering thrusters for a marine vessel; a pump for a submarine; a cooling pump for a nuclear power plant; an oil pump; a fuel pump; an engine controller for a gas turbine engine; a starter for a gas turbine engine; aircraft electrical loads; actuators for moving variable geometry in a gas turbine engine; anti-icing heating arrangements in a gas turbine engine; rotation of a shaft after shut-down.

A gas turbine engine comprising the arrangement as described. The gas turbine engine may comprise a rotor stage, wherein the variable reluctance rotor is integral with or mounted to the radial periphery of the rotor stage. Advantageously the number and weight of additional components is minimal. The gas turbine engine may comprise at least two axially spaced rotor stages, wherein the variable reluctance rotor is integral with or mounted to the radial periphery of two of the rotor stages.

The rotor stage or rotor stages may comprise any one of: a fan; a stage of an intermediate pressure compressor; a stage of a high pressure compressor; a stage of a booster compressor; a stage of a high pressure turbine; a stage of an intermediate pressure turbine; a stage of a low pressure turbine.

Any combination of the optional features is encompassed within the scope of the invention except where mutually exclusive.

The present invention will be more fully described by way of example with reference to the accompanying drawings, in which.

Figure 1:
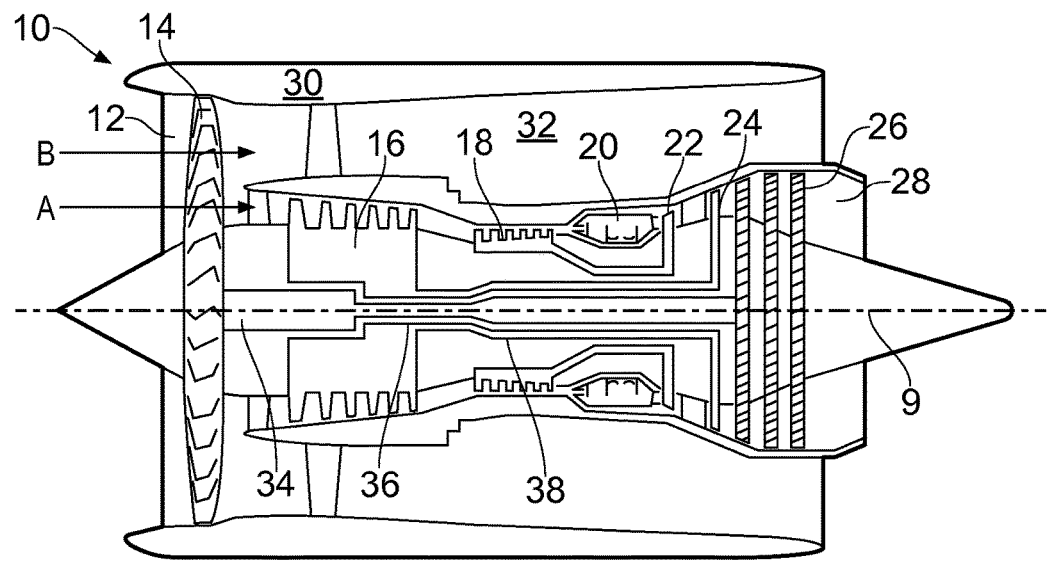
FIG. 1 is a sectional side view of a gas turbine engine.

A gas turbine engine 10 having a rotational axis 9 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

In use, air is drawn into the air intake 12 and is accelerated by the fan 14. It is split into the two axial flows A, B. In a high bypass ratio gas turbine engine, the majority of the air is passed through the bypass duct 32 to be expelled to give propulsive thrust. The remainder of the air is passed into the core engine (axial flow A) where it is compressed and accelerated by the intermediate pressure compressor 16 and then the high pressure compressor 18. Fuel is injected into the combustor 20 and combusted with the air from the high pressure compressor 18. Hot combustion gases are expelled from the combustor 20. The gases are expanded and slowed through the high pressure turbine 22, intermediate pressure turbine 24 and finally through the low pressure turbine 26 before being expelled through the exhaust nozzle 28 to provide a small amount of the propulsive thrust.

The low pressure turbine 26 is coupled to and drives the fan 14 via a low pressure shaft 34. The intermediate pressure turbine 24 is coupled to and drives the intermediate pressure compressor 16 via an intermediate pressure shaft 36. The high pressure turbine 22 is coupled to and drives the high pressure compressor 18 via a high pressure shaft 38. Thus the drive generated by the expansion of hot combustion gases through the turbines 22, 24, 26 is mechanically transmitted to the compressors 16, 18 and the fan 14 in order to suck the air into the gas turbine engine 10.

Figure 2:
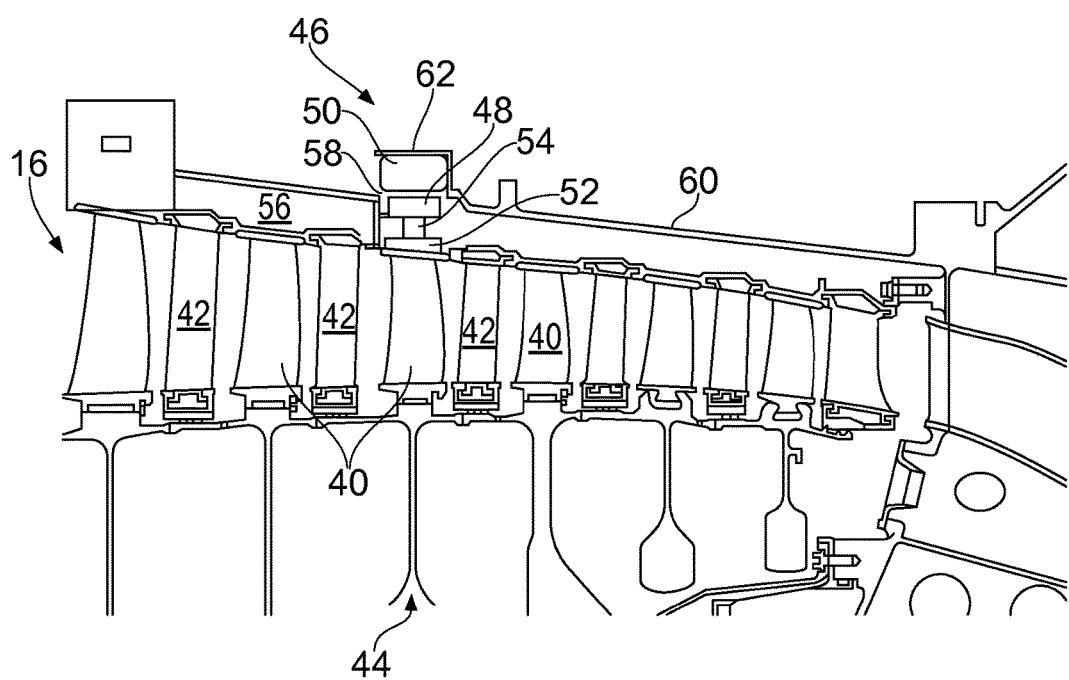
FIG. 2 is an enlargement of a compressor of a gas turbine engine including an arrangement of electrical machines.

An enlargement of the intermediate pressure compressor 16 is shown in FIG. 2. The compressor 16 comprises axially alternating annular arrays of rotor blades 40 and stator vanes 42. One particular rotor stage 44, comprising an annular array of rotor blades 40, is indicated by arrow 44. In axial alignment with this rotor stage 44 is an arrangement of electrical machines 46. The arrangement 46 includes a rotor 48 and a plurality of stators 50.

As illustrated a ring or shroud 52 is mounted to or integral with the radially outer tips of the rotor blades 40. Thus the ring or shroud 52 rotates with the rotor blades 40. The ring or shroud 52 preferably has at least comparable axial extent to the tips of the rotor blades 40 and includes seals at its axially forward and rear, radially inner edges. The seals abut the static casing from which extend the adjacent arrays of stator vanes 42. The seals act to seal the gas flow path through the compressor 16 and to substantially prevent gas egress radially outwards around the axial edges of the ring or shroud 52.

Mounted on the radially outer surface of the ring or shroud 52 is a mounting ring 54. The mounting ring 54 may be a continuous annular ring or may be a discontinuous ring comprised of an annular array of radially extending pillars or columns. The mounting ring 54 extends across a cavity 56 through which cooling flow may pass. The cooling flow may comprise compressor bleed air or may be supplied from the bypass duct 32 or another source. The mounting ring 54, and the components to which it is coupled, are therefore cooled by the cooling flow through the cavity 56. The mounting ring 54 may be axially shorter than the ring or shroud 52 to which it is mounted. It may be mounted to the axial centre of the ring or shroud 52. In some applications it may be mounted axially forwards or backwards of the centre of the ring or shroud 52.

Mounted on the radially outer edge of the mounting ring 54 is the rotor 48 of the arrangement 46. The rotor 48 is therefore driven by the rotor stage 44 to rotate in synchronicity therewith. The rotor 48 comprises a continuous ring or annulus. Advantageously the rotor 48 has minimal hoop stresses and can be optimised for weight and size because it is a continuous ring. Alternatively the rotor 48 may be comprised of two or more pieces that are coupled together during use to behave as if they were a continuous ring. Advantageously, where the rotor 48 is comprised of two or more pieces it permits easier assembly and disassembly of the arrangement 46, for example for maintenance or to replace all or part of the arrangement 46. The rotor 48 may be axially wider than the mounting ring 54 or may be substantially the same width or narrower. The rotor 48 may be partially located within the cavity 56 and therefore be cooled directly by the cooling flow through the cavity 56. Alternatively it may be located substantially outside the cavity 56 and therefore be cooled mainly by conduction from the mounting ring 54.

The rotor 48 is at least partially formed of a magnetically permeable material, for example a ferromagnetic material such as soft iron. The rotor 48 may be formed of ferromagnetic laminations, at least at its radially outer portion. Advantageously the rotor 48 is mechanically robust because it is formed of simple iron laminations, or similar constructions, and does not include windings or magnets. Thus there is little that can break or stop functioning which would require maintenance or replacement of components. The rotor 38 therefore has high reliability. Advantageously the rotor losses are also reduced because the rotor 48 does not include windings or magnets.

Radially outside the rotor 48 is an air gap 58. The rotor 48 is a variable reluctance rotor. That is, it presents a variable reluctance at the air gap 58, either by discontinuities in the laminations or because the surface of the rotor 48 is profiled.

The cavity 56 is enclosed on its radially outer side by casing 60. The casing 60 may be arranged to include an annular channel 62, continuous or discontinuous, in axial alignment with the rotor stage 44. Secured in the channel 62 is a plurality of stators 50, arranged as an annular or circumferential array. Each of the stators 50 may be secured in its own portion of the channel 62, in which case the channel 62 is discontinuous. Alternatively the stators 50 may be secured in a continuous channel 62 with circumferential gaps between adjacent stators 50.

Each stator 50 may include one or more windings. Each stator 50 may also or alternatively include one or more permanent magnets. Thus each stator 50 is configured to function, in conjunction with the rotor 48, as an electrical machine. There is no interaction between the stators 50 in the array of stators 50. Each stator 50 is self-exciting. Thus each electrical machine, comprising a stator 50 and the rotor 48, is independent of each other electrical machine in the arrangement 46. Advantageously each electrical machine can be optimised for a particular use. Thus each stator 50 may have a different circumferential extent and/or comprise a different arrangement of windings and permanent magnets relative to others of the stators 50 in the arrangement 46. Each or any of the electrical machines may be configured as a permanent magnet assisted synchronous reluctance machine, a switched reluctance machine with electromagnetic excitation, or an induction machine with solid rotor and electromagnetic excitation.

For example, one or more electrical machine in the arrangement 46 may be configured to output electrical power for the electronic controller of the gas turbine engine 10 in which the arrangement 46 is mounted. One or more others of the electrical machines in the arrangement 46 may be configured to output electrical power to drive an oil or fuel pump. One or more further electrical machines in the arrangement 46 may be configured to function as a multi-phase, for example three-phase, generator. Multiple electrical machines in the arrangement 46 may be configured to each function as one phase of a multi-phase electrical generator, for example three electrical machines together could form a three-phase generator.

The electrical machines in the arrangement 46 may also be used as motors to accelerate the gas turbine engine 10, or part thereof, to a self-sustaining speed. In this instance electrical power is supplied to the stators 50 of the electrical machines which cause the rotor 48 to rotate. The electrical machines may initially be used as motors and subsequently be switched to generators once the gas turbine engine 10 is at a self-sustaining speed.

Advantageously the rotor 48 has a large diameter, and therefore the stators 50 are located at a large radius from the rotational axis of the rotor 48. This enables large torque, and thus higher power extraction, even at slow rotor speeds because torque is proportional to the square of rotor diameter. Advantageously this property can be used to maintain rotation of the gas turbine engine 10 when fuel is shut off which prevents the problems inherent in shutting down the gas turbine engine 10 with static shafts. If the rotation of the gas turbine engine 10 is not maintained after fuel shut off the shaft cools unevenly and this may result in rotor bow. Consequently the rotor tips may rub if the gas turbine engine 10 is restarted too soon.

Figure 3:
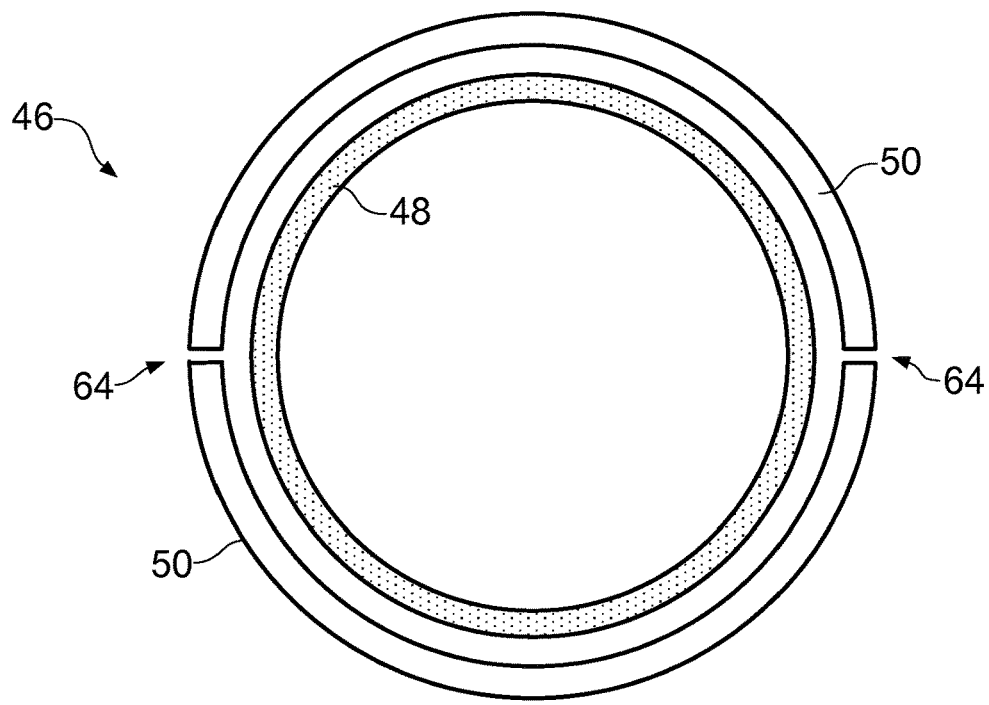
FIG. 3, FIG. 4 and FIG. 5 are schematic sectional views of an arrangement of electrical machines.
Figure 4:
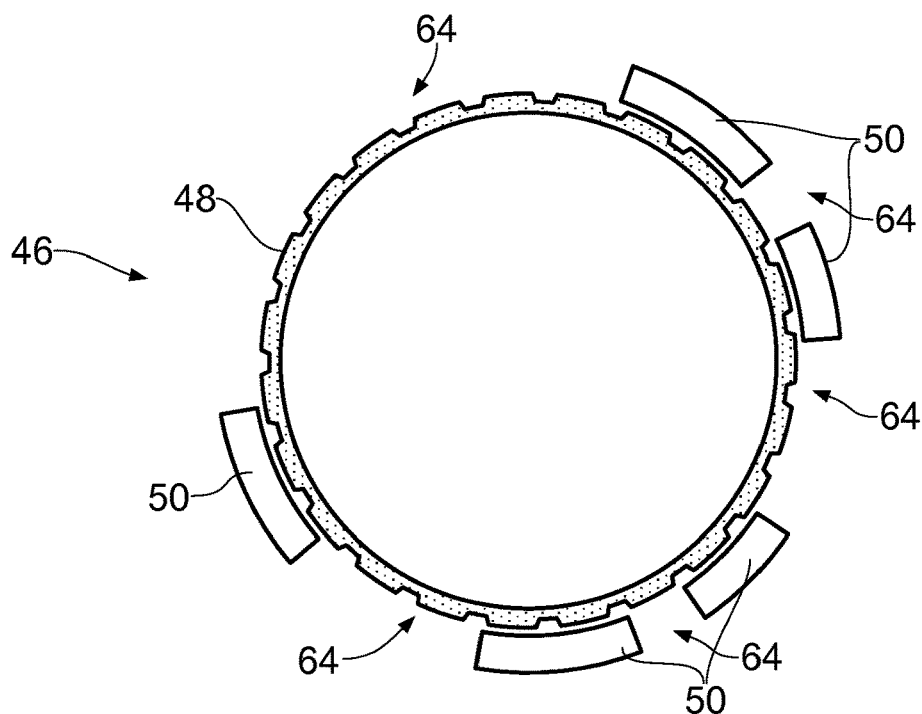
Figure 5:
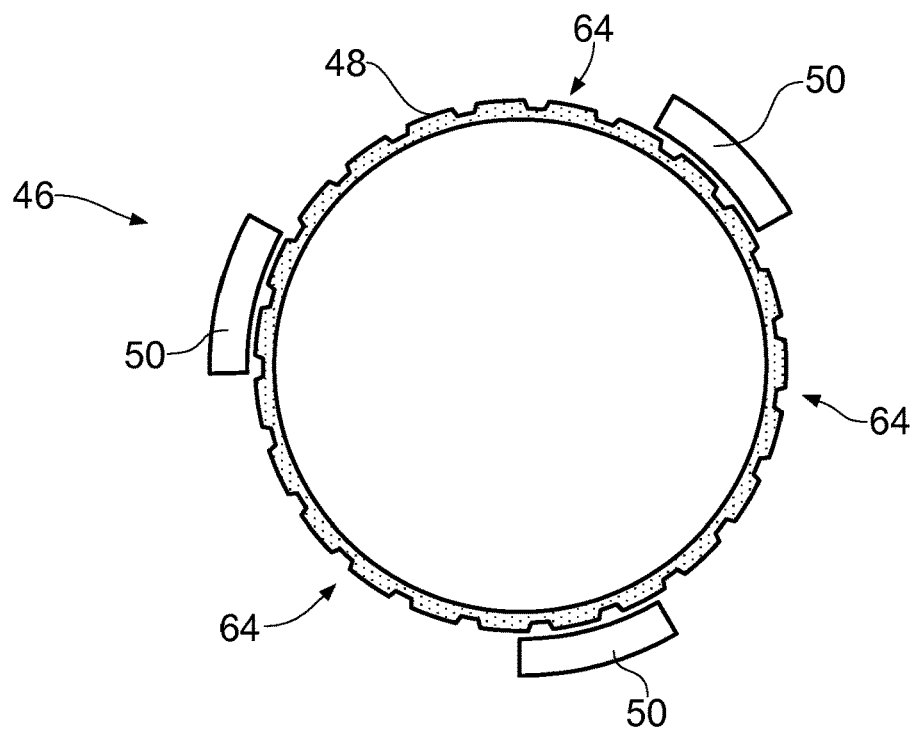

FIG. 3, FIG. 4 and FIG. 5 each show arrangements 46 comprising a rotor 48 and a plurality of stators 50. In FIG. 3 there are two stators 50 shown, which each extend for approximately 180° around the periphery of the rotor 48, with a small circumferential gap 64 between them. In FIG. 4 there are five stators 50 shown, which are arranged as an irregular annular array about the periphery of the rotor 48. In FIG. 5 there are three stators 50 forming a regularly spaced annular array about the periphery of the rotor 48. The stators 50 each extend circumferentially through a limited angle, for example 10° to 180°. Where access for assembly and disassembly is unencumbered each stator 50 may extend circumferentially over more than 180°. There may be two stators 50 each extending approximately 180° around the periphery of the rotor 48, as illustrated in FIG. 3. Alternatively the stators 50 may extend through a shorter arc and/or there may be more than two stators 50 forming the array of stators 50.

There is a circumferential gap 64 between adjacent pairs of stators 50. The circumferential length of the gap 64 may be different between different pairs of stators 50. In some applications the circumferential gaps 64 may be filled by the casing 60 between the discontinuous portions of the channel 62.

The stators 50 may be regularly spaced about the periphery of the rotor 48. For example, as illustrated in FIG. 5 the stators 50 are 120° apart. Advantageously the forces generated by one of the electrical machines are balanced by the forces generated by the others of the electrical machines.

The stators 50 may be irregularly spaced about the periphery of the rotor 48, as illustrated in FIG. 4. Advantageously the stators 50 can be positioned close to the loads to which their output power is supplied. Advantageously the stators 50 can be positioned circumferentially away from existing pipes or other features mounted to or close to the casing 58 in the vicinity of the rotor stage 44. It may be necessary to counteract any unbalanced tangential forces generated by having an asymmetrical array of stators 50.

Advantageously the stators 50 may be removed individually by translating them radially outwards away from the rotor 48. This is in contrast to former arrangements in which all the stators 50 had to be removed together and/or the removal was effected by axial translation. Thus the removal of individual stators 50 for repair or replacement is simpler than in previous arrangements. Since the rotor 48 is simple it is expected that it will rarely fail or require maintenance. Most faults will therefore occur in a stator 50 which can be easily replaced or repaired. Advantageously, because there is no interaction between stators 50 a fault in one electrical machine in the arrangement 46 will not propagate to others of the electrical machines in the arrangement 46. Therefore the arrangement 46 is more robust than previous arrangements of multiple electrical machines.

One or more of the stators 50 may output signals from which it is possible to calculate the speed and/or acceleration of the rotor 48. For example the frequency of the variation in reluctance observed at each stator 50 can be used to calculate the position, speed and/or acceleration of the rotor 48. The resolution of the calculations is dependent on the number of teeth on the rotor 48, and therefore the reluctance variations. Thus in addition to the electrical machines outputting electrical power to be supplied to a variety of loads, one or more of the electrical machines may also output signals suitable for calculation of rotor speed and/or acceleration, or may calculate and output the rotor speed and/or acceleration. Optionally a speed probe could be provided to count the rotor teeth instead of having a separate phonic wheel associated with a shaft. Such a speed probe may be mounted between a pair of stators 50, advantageously using the circumferential gaps 64 that may be provided between adjacent stators 50.

The output of two or more electrical machines may be coupled electrically. The machines may be selectively coupled for only some of the time during use of the arrangement 46. This enables more power to be supplied to a particular load at times when it is required. For example, the output of an electrical machine that is normally supplied to cabin entertainment systems may be coupled to the output of another of the electrical machines during startup of the gas turbine engine 10 in order to provide extra power to the fuel pumps. Such selective electrical coupling of the outputs of some of the electrical machines can also be used to provide redundancy of supply without having a fully duplex system. Thus a non-essential load may be switched off and the power from its supply electrical machine diverted to essential loads to temporarily replace supply from an inoperative electrical machine in the arrangement 46.

Figure 6:
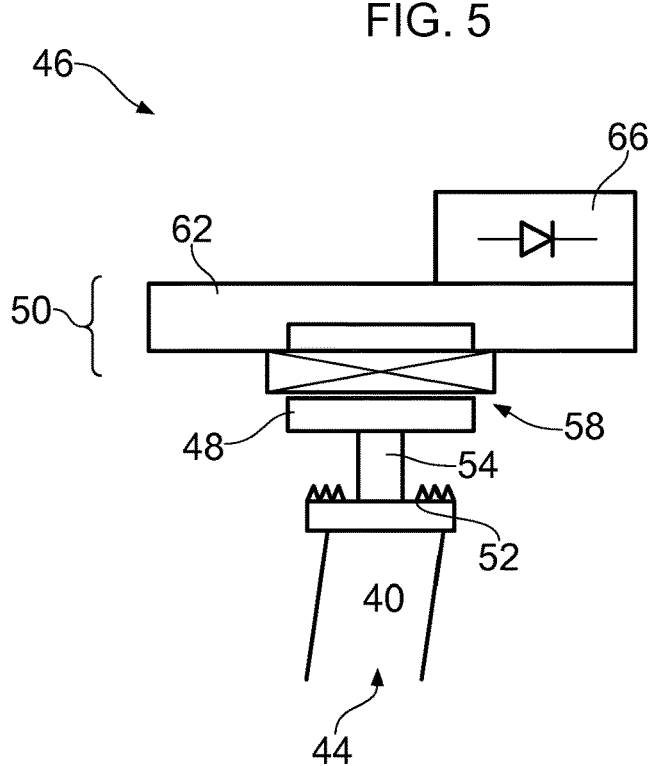
FIG. 6 is a schematic sectional view of part of an arrangement of electrical machines.

The outputs of two or more electrical machines may be coupled by providing a rectifier 66 on one or more of the stators 50. Such a rectifier 66 is shown schematically in FIG. 6.

The arrangements of electrical machines 46 have been described as having a ring or shroud 52 mounted to the outer tips of the rotor blades 40 of the rotor stage 44, a mounting ring 54 coupled to the ring or shroud 52 and the rotor 48 of the arrangement 46 mounted to the mounting ring 54 other configurations are also feasible. For example, the ring or shroud 52, or at least the radially outer part of it, may support the rotor 48. The mounting ring 54 may therefore be omitted. The ring or shroud 52 may comprise the rotor 48, by including the magnetically permeable laminations, and thus the ring or shroud 52 is effectively omitted because it is replaced by the rotor 48. In this instance the rotor 48 may be integral with the radial periphery of the rotor stage 44.

The mounting rings 54 may also be omitted, and the rings or shrouds 52 may form the rotors 48 or support them directly, where there are two or more arrangements 46 provided on adjacent or spaced rotor stages 44. Where an arrangement 46 is supported by two adjacent rotor stages 44 the mounting rings 54 can be omitted. The rings or shrouds 52 may be replaced by the rotor 48 or may be retained. In this instance the rings or shrouds 52 may be radially larger than in other configurations so that the rotor 48 can bridge the two stages without impeding the static structure supporting the intermediate stator vane 42.

Figure 7:
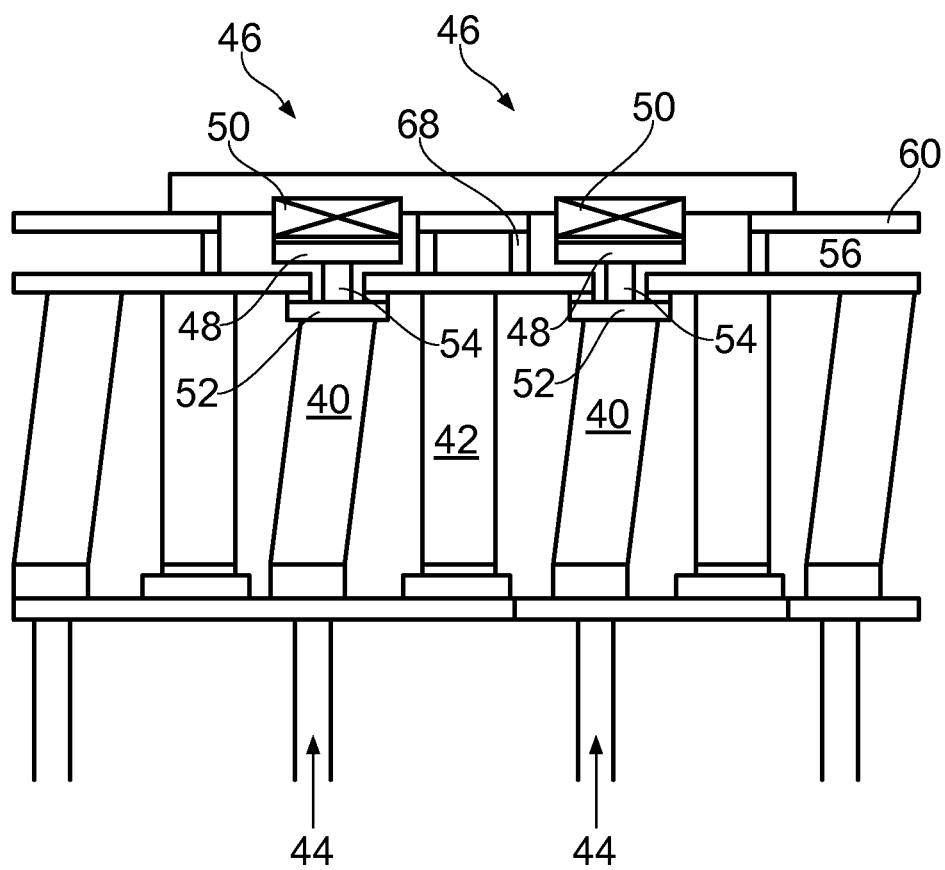
FIG. 7 is an enlargement of a compressor of a gas turbine engine including an arrangement of electrical machines.

FIG. 7 shows the compressor 16 having two rotor stages 44 which each have an arrangement of electrical machines 46 about their outer peripheries. There may be sealing 68 axially between the two arrangements 46, particularly to maintain a different gas pressure around one rotor 48 compared to the other rotor 48. The sealing 68 may also form part of the support for the stator vanes 42. Advantageously providing two arrangements of electrical machines 46 enables more stators 50 to be provided, and therefore more electrical machines. Although the two arrangements 46 are illustrated on adjacent rotor stages 44 this is not essential. For example, there may be one or more rotor stages 44 between the rotor stages 44 that support each of the two arrangements 46. Alternatively one arrangement 46 may be supported by a rotor stage 44 in the intermediate pressure compressor 16 and another arrangement 46 may be supported by a rotor stage 44 in the fan 14, booster compressor or high pressure compressor 18. Alternatively one or more arrangements 46 may be supported on a rotor stage 44 in any of the high pressure, intermediate pressure or low pressure turbines 22, 24, 26. Where two arrangements 46 are supported by rotor stages 44 in the turbines 22, 24, 26 they may be supported by rotor stages 44 in the same or different ones of the high pressure, intermediate pressure or low pressure turbines 22, 24, 26.

Figure 8:
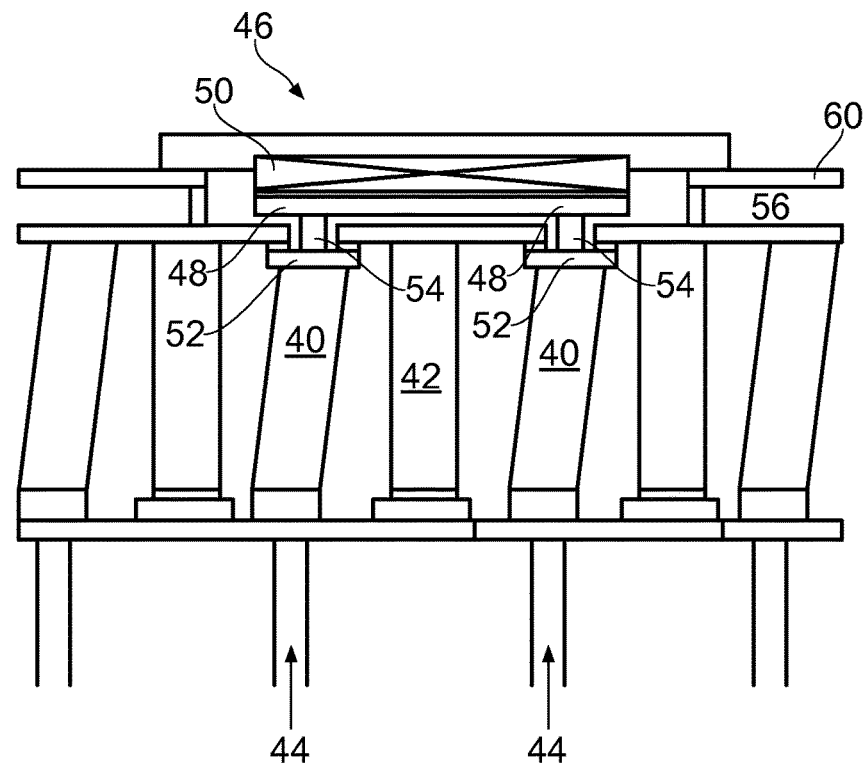
FIG. 8 is an enlargement of a compressor of a gas turbine engine including an arrangement of electrical machines.

FIG. 8 shows the compressor 16 having two adjacent rotor stages 44 which together support the same arrangement of electrical machines 46. In this figure the rotor 48 is axially wider than that shown in earlier figures so that it is supported by the mounting ring 54 from each of the rotor stages 44. Similarly the stators 50 are axially longer so that they have substantially the same axial span as the rotor 48. Advantageously the resulting electrical machines, comprising one of the array of stators 50 and the rotor 48, are larger than is possible with an arrangement 46 supported by a single rotor stage 44 and so can generate more electrical power.

Figure 9:
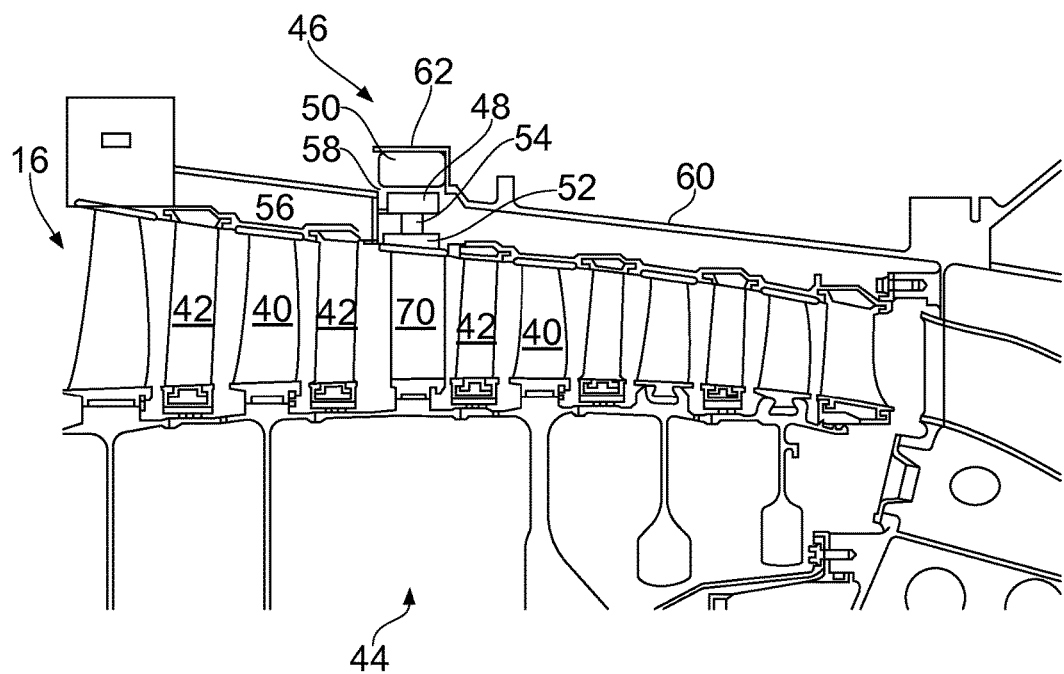
FIG. 9 is an enlargement of a compressor of a gas turbine engine including an arrangement of electrical machines.

FIG. 9 is similar to FIG. 2. However, the rotor stage 44 which supports the arrangement of electrical machines 46 is different. The rotor blades 40 are replaced by an array of non-compressing rotor elements 70. The non-compressing rotor elements 70 rotate with the adjacent arrays of rotor blades 40 which are coupled to the same rotating shaft 36. However, the rotor elements 70 are shaped such that the air flow past them is not compressed or accelerated. Such a rotor stage 44 may be axially flanked by arrays of stator vanes 42. It may comprise an extra rotor stage 44 relative to a conventional compressor 16 or may replace one of the arrays of compressing rotor blades 40. Thus the primary purpose of the non-compressing rotor elements 70 is to support the rotor 48 of the arrangement of electrical machines 46, via the ring or shroud 52 and mounting ring 54.

Figure 10:
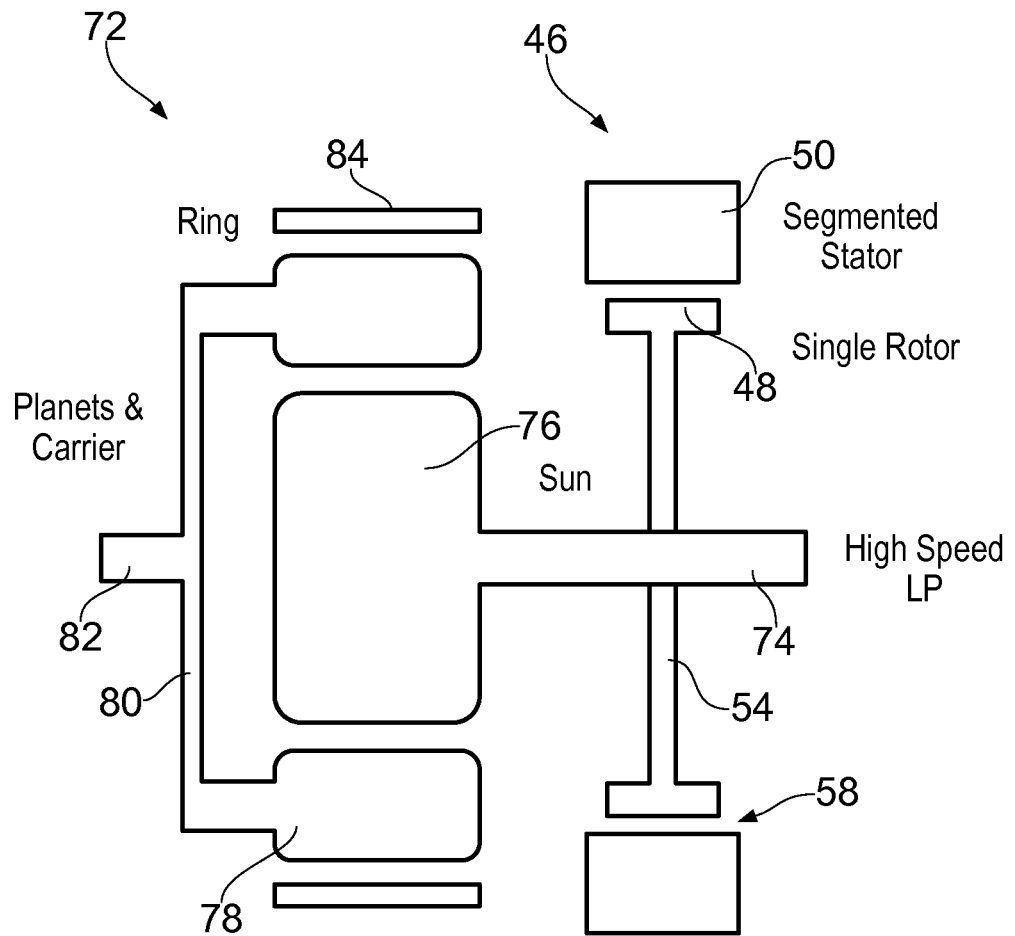
FIG. 10 is a schematic sectional view of an epicyclic gearbox including an arrangement of electrical machines.

FIG. 10 shows a schematic sectional view of an epicyclic gearbox 72 including an arrangement of electrical machines 46. The epicyclic gearbox 72 comprises an input shaft 74. For example the input shaft 74 may be coupled to or may be the low pressure shaft 34 driven by the low pressure turbine 26. The input shaft 74 is coupled to a sun gear 76 in the form of a toothed wheel. Radially outside and meshing with the sun gear 76 is a plurality of planet gears 78, each of which is also a toothed wheel. The planet gears 78 are arranged as a regularly spaced array around the sun gear 76. The planet gears 78 are ganged together by a planet carrier 80 which constrains them to precess about the sun gear 76 in synchronicity but allows each planet gear 78 to rotate about its own axis. The planet carrier 80 is coupled to an output shaft 82. The output shaft 82 may, for example, be coupled to the fan 14 of the gas turbine engine 10 to transmit the drive from the low pressure turbine 26 at a different speed by virtue of the gear ratio between the sun gear 76 and planet carrier 80. The epicyclic gearbox 72 also includes a ring gear 84 radially outside and meshing with the planet gears 78. The ring gear 84 is static.

The arrangement of electrical machines 46 is supported on the input shaft 74 of the epicyclic gearbox 72 by a mounting ring 54. The mounting ring 54 can be relatively thin in the axial direction and/or be hollow or include holes in its surface because the rotor 48 is light. Advantageously the mounting ring 54 has a large diameter so that the rotor 48 also has a large diameter. This improves the torque production, even at low speed. The arrangement 46 is as previously described. Thus it comprises the rotor 48 and an array of stators 50 about the periphery of the rotor 48 with a small airgap 58 therebetween.

Alternatively if space around the input shaft 74 is limited, the arrangement of electrical machines 46 may be supported on the output shaft 82. It will therefore rotate more slowly.

The epicyclic gearbox 72 may be arranged so that the input shaft 74 is coupled to the planet carrier 80 or the ring gear 84 instead of the sun gear 76. Similarly the output shaft 82 may be coupled to the ring gear 84 or the sun gear 76 instead of the planet carrier 80. The epicyclic gearbox 72 may be configured as a differential gearbox in which the sun gear 76, planet gears 78, planet carrier 80 and ring gear 84 all rotate. In this case there may be one input shaft 74 and two output shafts 82 or two input shafts 74 and one output shaft 82, each shaft coupled to one of the sun gear 76, planet carrier 80 and ring gear 84.

Where the ring gear 84 of the epicyclic gearbox 72 rotates, the rotor 48 of the arrangement 46 may be coupled to or formed by the ring gear 84. The mounting ring 54 may be provided radially between the ring gear 84 and the rotor 48 or be omitted. The array of stators 50 is then located radially outside the rotor 48, which itself is radially outside the components of the epicyclic gearbox 72. Typically a rotor 48 mounted to the ring gear 84 will rotate more slowly than one mounted to the input shaft 74. Beneficially softer iron can be used as it need not be so strong, and therefore the iron losses are reduced or minimised.

Similarly the arrangement of electrical machines 46 may be mounted to the input shaft 74 or output shaft 82 of a different type of gearbox or gearing arrangement.

Figure 11:
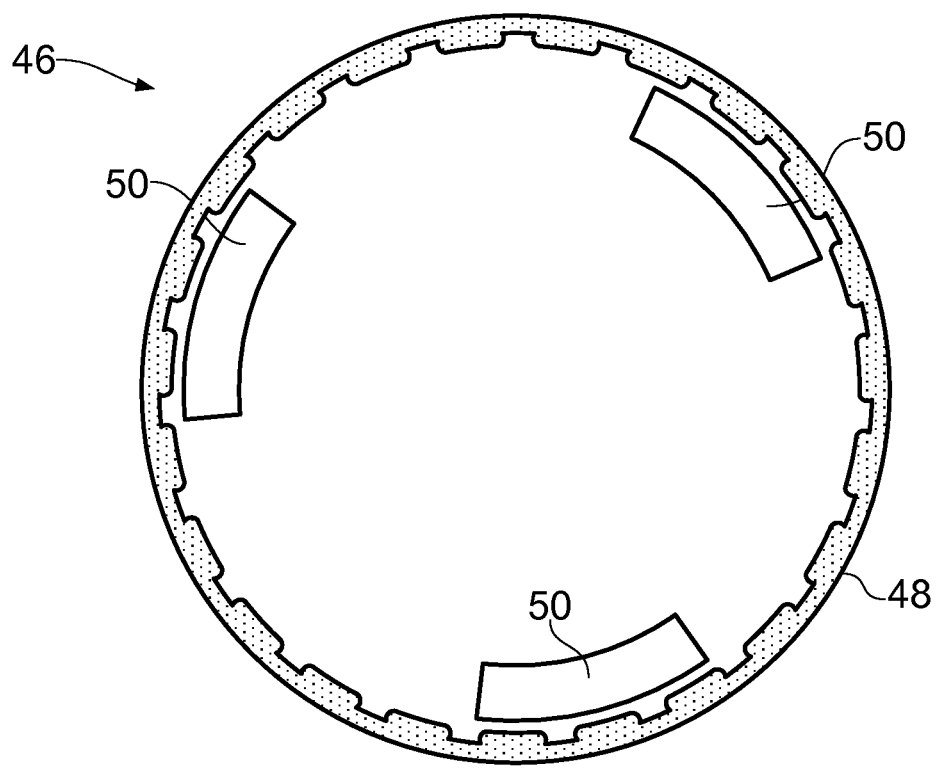
FIG. 11 is a schematic sectional view of an arrangement of electrical machines.

Although the arrangement 46 has been described with the array of stators 50 located radially outside the rotor 48, the reverse is also feasible. This is shown in FIG. 11. Thus the rotor 48 may be located radially outside the array of stators 50. The stators 50 may be configured to be removable by translating radially inwards. Alternatively the rotor 48 may be removable, either by translating axially forwards or backwards or by splitting into two or more pieces and lifting away radially, in order to expose the stators 50 which may then be removed radially outwards for replacement or repair.

Where the epicyclic gearbox 72 has a static planet carrier 80, so that the planet gears 78 each rotate about their own axes but do not precess, and has rotating sun gear 76 and ring gear 84 then the planet carrier 80 may be used to mount the stators 50. The rotor 48 may be formed by the sun gear 76, the ring gear 84, the input shaft 74 or the output shaft 82. Alternatively the rotor 48 may be mounted to any of these components of the epicyclic gearbox 72.

Although it is beneficial to mount the arrangement of electrical machines 46 to an existing rotor stage 44 this is not necessary. The rotor 48 may be rotated by some other means, such as being mounted directly to a shaft. It may be beneficial to couple the rotor 48 to a shaft via a gearbox to increase the speed of the rotor 48 and/or to compensate for a wide speed range generated by the shaft. Alternatively power electronics or other means may be provided to compensate for a wide speed range relative to that which is desirable for the rotor 48.

Figure 12:
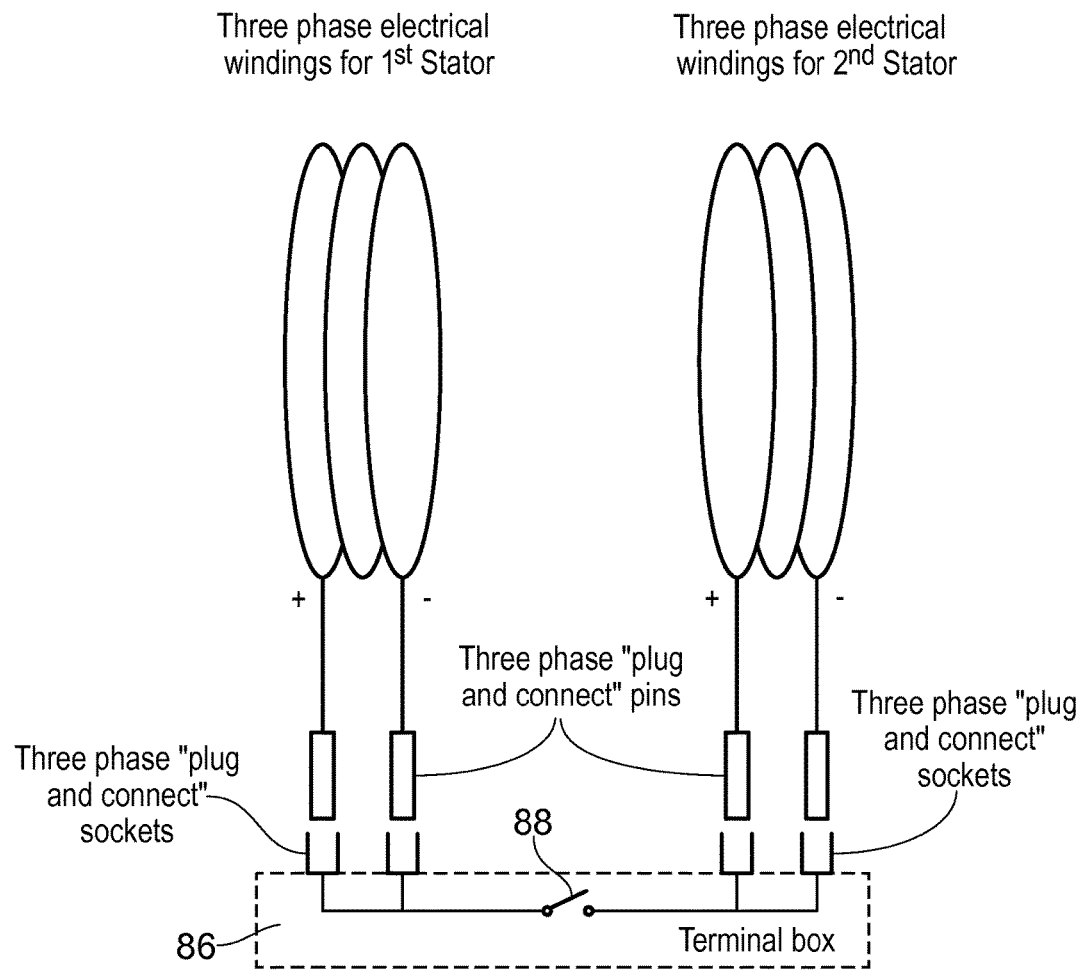
FIG. 12 is a schematic illustration of electrical connections.

The stators 50 may include windings which are coupled to a terminal box by suitable connectors. For example, the connectors may be plug and socket arrangements which are easily releasable when the stator 50 is to be removed for maintenance or to be replaced. Such connectors are shown schematically in FIG. 12. Optional coupling, terminal box 86 and isolator 88, is shown in FIG. 12.

There may be cooling arrangement for each stator 50 of the arrangement of electrical machines 46. The cooling arrangement may comprise one or more cooling ducts or manifolds that pass through the stator 50 or encircle part of the stator 50. There may be one cooling arrangement for each stator 50 or one cooling arrangement that is configured to cool more than one of the stators 50. Such cooling arrangements may be substantially conventional for electrical machine stators. The coolant may be specific. Alternatively it may be air from the bypass duct 32 of a gas turbine engine 10 in which the arrangement 46 is mounted. Alternatively it may be air bled from a compressor 16, 18 of a gas turbine engine 10 in which the arrangement 46 is mounted. The coolant arrangement may comprise an ejector that supplies air from the bypass duct 32 as coolant and is controlled by air bled from a compressor 16, 18 of a gas turbine engine 10. Alternatively the coolant may be fuel or oil. The stators 50 may be cooled by convection through the laminations.

The electrical machines in the arrangement 46 may supply electrical power for a variety of uses. Where the arrangement 46 is mounted to a rotor stage 44 of a gas turbine engine 10 the electrical power from one or more of the electrical machines may be supplied to any one or more of a fuel pump, an oil pump, actuators for variable stator vanes or the like, and an engine controller such as an electronic engine controller. It may also supply electrical power to a breather arrangement in a gas turbine engine 10 which receives a mixture of oil and air, traps the oil and expels the air. The electrical machines in the arrangement 46 may extract electrical power from one shaft and supply it to another electrical machine on another shaft, whether constituted as the arrangement 46 or differently, which acts as a motor. Advantageously off-design operating conditions can be managed by extracting power from certain shafts and supplying it to other shafts dynamically.

Where the arrangement 46 is mounted to a rotor stage 44 of a gas turbine engine 10 used in a marine vessel the electrical power may be supplied to tunnel or steering thrusters. Alternatively the arrangement 46 may be mounted to a rotor stage 44 that is part of the tunnel or steering thrusters. The arrangement 46 may also supply electrical power for secondary pumping in a submarine.

The arrangement 46 may be installed in an industrial power plant, such as a diesel engine or gas turbine engine 10. The electrical power from the electrical machines can then be supplied to a variety of applications within an electrical-drive system, such as a starter-generator.

The arrangement of electrical machines 46 may be installed with a nuclear power plant. The electrical power produced by the electrical machines can be supplied to cooling pumps for the power plant, gas venting or for other functions.

The invention claimed is:

1. A gas turbine engine comprising:
   a rotor stage;
   a variable reluctance rotor without windings or magnets; and
   an annular array of stators, each stator configured to function, in conjunction with the variable reluctance rotor, as an electrical machine,
   wherein the stators are irregularly spaced,
   wherein each irregularly spaced stator extends along a circumference of the variable reluctance rotor by a different amount than at least one stator adjacent to the each stator, and
   wherein the variable reluctance rotor is integral with or mounted to the radial periphery of the rotor stage.

2. The gas turbine engine as claimed in claim 1, wherein each stator is self-exciting.

3. The gas turbine engine as claimed in claim 1, wherein the rotor comprises a magnetically permeable material.

4. The gas turbine engine as claimed in claim 1, further comprising a circumferential gap between adjacent stators.

5. The gas turbine engine as claimed in claim 1, wherein each stator has a circumferential extent of up to 180°.

6. The gas turbine engine as claimed in claim 1, wherein each stator comprises any or all of: one or more windings; and one or more permanent magnets or electromagnets.

7. The gas turbine engine as claimed in claim 1, wherein the rotor is radially outside the array of stators.

8. The gas turbine engine as claimed in claim 1, wherein the rotor is formed of two or more pieces, the pieces being joined during use of the arrangement and being detached for assembly and/or disassembly of the arrangement.

9. The gas turbine engine as claimed in claim 1, wherein at least one of the stators is configured as a 3-phase generator or as a motor.

10. The gas turbine engine as claimed in claim 1, comprising at least three stators, each stator configured as a phase of a distributed multi-phase generator.

11. The gas turbine engine as claimed in claim 1, wherein at least one of the stators is configured to output the speed and/or acceleration of the rotor.

12. The gas turbine engine as claimed in claim 1, wherein the output of at least two of the stators is coupled, and wherein one of the stators comprises a rectifier.

13. The gas turbine engine as claimed in claim 1, wherein the rotor is coupled to a shaft of a gearbox, wherein the shaft is an input shaft or an output shaft.

14. The gas turbine engine as claimed in claim 13, wherein the gearbox is an epicyclic gearbox.

15. The gas turbine engine as claimed in claim 1, wherein the output of each electrical machine is coupled to a load, the loads comprising any one or more of: a breather arrangement in a gas turbine engine; one or more tunnel or steering thrusters for a marine vessel; a pump for a submarine; a cooling pump for a nuclear power plant; an oil pump; a fuel pump; an engine controller for a gas turbine engine; a starter for a gas turbine engine; aircraft electrical loads; actuators for moving variable geometry in a gas turbine engine; anti-icing heating arrangements in a gas turbine engine; rotation of a shaft after shut-down.

16. The gas turbine engine as claimed in claim 1, wherein the rotor stage comprise any one of: a fan; a stage of an intermediate pressure compressor; a stage of a high pressure compressor; a stage of a booster compressor; a stage of a high pressure turbine; a stage of an intermediate pressure turbine; and a stage of a low pressure turbine.

17. A gas turbine engine comprising:
at least two axially spaced rotor stages;
a variable reluctance rotor without windings or magnets; and
an annular array of stators, each stator configured to function, in conjunction with the variable reluctance rotor, as an electrical machine,
wherein the stators are irregularly spaced,
wherein each irregularly spaced stator extends along a circumference of the variable reluctance rotor by a different amount than at least one stator adjacent to the each stator, and
wherein the variable reluctance rotor is integral with or mounted to the radial periphery of two of the rotor stages.

18. The gas turbine engine as claimed in claim 17, wherein the rotor stages comprise any one of: a fan; a stage of an intermediate pressure compressor; a stage of a high pressure compressor; a stage of a booster compressor; a stage of a high pressure turbine; a stage of an intermediate pressure turbine; and a stage of a low pressure turbine.

* * * * *